US009800555B2

(12) United States Patent
Ignatenko et al.

(10) Patent No.: US 9,800,555 B2
(45) Date of Patent: Oct. 24, 2017

(54) ATTRIBUTE-BASED ENCRYPTION

(71) Applicant: KONINKLIJKE PHILIPS N.V., Eindhoven (NL)

(72) Inventors: Tanya Ignatenko, Eindhoven (NL); Muhammad Asim, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 5 days.

(21) Appl. No.: 14/420,114

(22) PCT Filed: Jul. 22, 2013

(86) PCT No.: PCT/IB2013/055995
§ 371 (c)(1),
(2) Date: Feb. 6, 2015

(87) PCT Pub. No.: WO2014/027263
PCT Pub. Date: Feb. 20, 2014

(65) Prior Publication Data
US 2015/0222605 A1  Aug. 6, 2015

Related U.S. Application Data

(60) Provisional application No. 61/684,216, filed on Aug. 17, 2012.

(51) Int. Cl.
G06F 21/00 (2013.01)
H04L 29/06 (2006.01)
(Continued)

(52) U.S. Cl.
CPC .......... H04L 63/0428 (2013.01); H04L 9/088 (2013.01); H04L 9/3073 (2013.01); H04L 63/20 (2013.01); H04L 2209/76 (2013.01)

(58) Field of Classification Search
CPC ..... H04L 63/0428; H04L 63/20; H04L 9/088; H04L 9/3073; H04L 2209/76
See application file for complete search history.

(56) References Cited

U.S. PATENT DOCUMENTS

2004/0230792 A1* 11/2004 McCarty ................. G06F 21/10
713/153
2012/0300936 A1* 11/2012 Green .................... H04L 9/3073
380/278

FOREIGN PATENT DOCUMENTS

CN  101807991    * 8/2010
WO  2011045723 A1  4/2011

OTHER PUBLICATIONS

Bethencourt, J. et al., "Ciphertext-Policy Attribute-Based Encryption", Proceedings of the 2007 IEEE Symposium on Security and Privacy, IEEE Computer Society, Washington, DC, pp. 321-334, 2007.

(Continued)

Primary Examiner — Lisa Lewis

(57) ABSTRACT

A system for attribute-based encryption comprises a first encrypter (11) and a second encrypter (12). The first encrypter (11) comprises an input unit (1) for determining a message and a policy over a set of attributes, wherein the policy comprises a plurality of components, and a first cryptographic unit (2) for generating an encrypted representation of the message and an encrypted representation of the plurality of components. The second encrypter (12) comprises a receiving unit (3) for receiving the encrypted representation of the message and the encrypted representation of the plurality of components, and a second cryptographic unit (4) for transforming the encrypted representation of the message and the encrypted representation of the plurality of components into an attribute-based encrypted message associated with the policy.

20 Claims, 3 Drawing Sheets

(51) Int. Cl.
*H04L 9/08* (2006.01)
*H04L 9/30* (2006.01)

(56) References Cited

OTHER PUBLICATIONS

Akinyele, J. et al., "Self-Protecting Electronic Medical Records Using Attribute-Based Encryption", SPSM 2011 Proceedings of the 1st ACM workshop on Security and Privacy in smartphones and mobile devices, pp. 75-86, ACM, NY.
Green, M. et al., "Outsourcing the Decryption of ABE Ciphertexts", Proceedings of USENIX Security Symposium, 2011.
Tassanaviboon, A. et al. "OAuth and ABE based authorization in semi-trusted cloud computing", Proceedings of the second international workshop on Data intensive computing in the clouds, ACM, 2011.
Xiong, H. et al. "Towards end-to-end secure content storage and delivery with public cloud", Proceedings of the second ACM conference on Data and Application Security and Privacy. ACM 2012.
Liang, X. et al. "Attribute based proxy re-encryption with delegating capabilities", ACM Conference on Computer and Communications Security—CCS, pp. 276-286, 2009.
Luo, S. et al: "Ciphertext Policy Attribute-Based Proxy Re-encryption", Information and Communications Security Lecture Notes in Computer Science vol. 6476, 2010, pp. 401-415.
Shamir, A., "How to share a secret" Communications of the ACM, vol. 22, No. 11, 1979, pp. 612-613.

* cited by examiner

ATTRIBUTE-BASED ENCRYPTION

CROSS-REFERENCE TO PRIOR APPLICATIONS

This application is the U.S. National Phase application under 35 U.S.C. §371 of International Application No. PCT/IB2013/055995, filed on Jul. 22, 2013, which claims the benefit of U.S. Provisional Application No. 61/684,216, filed on Aug. 17, 2012. These applications are hereby incorporated by reference herein.

FIELD OF THE INVENTION

The invention relates to attribute-based encryption.

BACKGROUND OF THE INVENTION

An increasing need for data exchange among different parties involved in a care cycle ranging from traditional healthcare to home healthcare and wellness services has made secure management of health data a real issue. Other application fields have also seen an increasing interest in secure data transmission and management. Current approaches to health data management are based on traditional security mechanisms complemented with physical and administrative procedures. This combination results in a limited availability of health information and cumbersome exchange of health records. Digital policy management and enforcement technologies outperform the traditional mechanisms and procedures by offering (1) end-to-end privacy and security in heterogeneous networks, protecting data independently of the infrastructure over which the data travel and of institutional boundaries; (2) usage control on top of attribute-based access control mechanisms, which is important in healthcare applications; and (3) simple interoperable security architecture that allows systems to be developed in a network agnostic way, obviating the need for network specific security provisions and hence reducing implementation and maintenance costs. However, the cryptographic algorithms that are needed in secure data exchange may be computationally intensive.

J. Bethencourt, A. Sahai, and B. Waters, "Ciphertext-Policy Attribute-Based Encryption", Proceedings of the 2007 IEEE Symposium on Security and Privacy, pages 321-334, 2007, discloses a digital data security and management system based on an attribute-based encryption scheme (ABE), such as a ciphertext-policy ABE scheme (CP-ABE). In this scheme data are encrypted according to an access structure, also referred to as access control policy, so that only the users with the correct attributes can decrypt the data. To be able to decrypt the data, a user gets from the trusted authority a specific private key that corresponds to the set of certified attributes he/she possesses.

Joseph A. Akinyele et al., "Self-Protecting Electronic Medical Records Using Attribute-Based Encryption", http://eprint.iacr.org/2010/565. pdf, discloses an implementation of a CP-ABE scheme on a portable device for protection of electronic medical records.

M. Green, S. Hohenberger, B. Waters, "Outsourcing the Decryption of ABE Ciphertexts", Proceedings of USENIX Security, 2011, discloses a method comprising a user providing the cloud with a single transformation key that allows the cloud to translate any ABE ciphertext satisfied by that user's attributes into an El Gamal-style ciphertext, without the server being able to read the user's messages. The resulting El Gamal-style ciphertext is then transmitted to the user, and the user can decrypt it.

SUMMARY OF THE INVENTION

It would be advantageous to have an improved attribute-based encryption system. To better address this concern, a first aspect of the invention provides a system comprising a first encrypter and a second encrypter, the first encrypter comprising:
an input unit for determining a message and a policy over a set of attributes, wherein the policy comprises a plurality of components;
a first cryptographic unit for generating an encrypted representation of the message and an encrypted representation of the plurality of components; and the second encrypter comprising:
a receiving unit for receiving the encrypted representation of the message and the encrypted representation of the plurality of components;
a second cryptographic unit for transforming the encrypted representation of the message and the encrypted representation of the plurality of components into an attribute-based encrypted message associated with the policy.

This scheme allows the first encrypter to use an encryption method that is computationally less demanding than the encryption step of the attribute-based encryption scheme. Typically, the encryption part of an attribute-based encryption system is computationally expensive. For example, the computational complexity increases linearly with the size of the access control policy, measured with the number of attributes in the access control policy. The encryption performed by the first encrypter makes it possible to transmit the message and the policy securely to the second encrypter. The second encrypter transforms the message and policy into an attribute-based encrypted message associated with the policy, thereby reducing the amount of computations that need to be performed by the first encrypter.

Although Green et al. (cited above) discloses outsourcing of a decryption step of an attribute-based encryption scheme, the method disclosed therein does not enable outsourcing an encryption step of an attribute-based encryption scheme.

The first encrypter may be implemented as part of a mobile terminal and the second encrypter is implemented as part of a different device than the mobile terminal. This allows an effective implementation of an attribute-based encryption scheme on a mobile terminal, because the computational load of an encryption step of an attribute-based encryption method is reduced.

In another aspect, the invention provides a system for attribute-based encryption, the system comprising:
a first encrypter comprising an input unit for determining a message and a policy over a set of attributes, wherein the policy comprises a plurality of components; and a first cryptographic unit comprising:
a secret generator for generating a secret;
a message encrypting unit for encrypting the message in dependence on the secret to obtain the encrypted representation of the message;
a policy transforming unit for transforming respective ones of the components of the policy in dependence on the secret to obtain respective policy ciphertext components; and
a secret encrypting unit for encrypting the secret to obtain an encrypted secret; and
a second encrypter comprising a receiving unit for receiving the encrypted representation of the message and the encrypted representation of the plurality of components; and a second cryptographic unit comprising:

a share generating unit for generating a plurality of encrypted shares of the encrypted secret based on a key that does not allow decryption of the encrypted secret; and a combining unit for combining respective ones of the policy ciphertext components with respective ones of the encrypted shares of the encrypted secret, to obtain a cryptographic representation of the policy.

This system reduces the computational burden on the first cryptographic unit, when the latter desires to perform an encryption operation of an attribute-based encryption scheme. The computational burden is reduced because a portion of the computations is taken over by the second cryptographic unit. Moreover, a transmission of data between the first and second cryptographic unit is secure, because the secret protects both the message and the components of the policy. Since the message encrypting unit encrypts the message, the message is protected from being decrypted by unauthorized persons. Moreover, the policy transforming unit may transform the components of the policy in such a way that unauthorized entities, including the second cryptographic unit, cannot modify the components, such as attributes, of the policy. Although the share generating unit is capable of generating encrypted shares of the encrypted secret, the second cryptographic unit is not capable of recovering the secret, because the secret is encrypted. The combining unit performs a step which may be relatively computationally expensive: the combining of the policy ciphertext components with the encrypted shares. Such a combination could well include exponentiation and multiplication steps, which are computationally expensive, to make the scheme cryptographically secure. These computationally expensive operations do not need to be performed by the first cryptographic unit.

The respective ones of the components of the policy may correspond to respective attributes. For example, a policy may comprise a logic expression involving a plurality of attributes. The components may correspond to those attributes. The relationship between the attributes in the logic expression may be represented within the components or as a separate data element. Because the components are combined with the shares of the secret, the party who wants to decrypt the message needs to have a key comprising the appropriate attributes to match with the attributes in the policy. Consequently, it may be relatively efficient to package the attributes as separate components in the communication between the first encrypter and the second encrypter.

The combining unit may be arranged for enforcing a relationship between attributes in the policy by means of the encrypted shares of the encrypted secret. The choice of the attributes in the policy may be enforced by the first cryptographic unit. Moreover, the semi-trusted second cryptographic unit may perform the cryptographic operations to enforce the relationship between the attributes in the policy. This can be done by applying the shares of the secret in such a way that a predetermined minimum number of a particular set of attributes is needed to decrypt the message, for example.

The second cryptographic unit may be arranged for generating the encrypted shares directly from the encrypted secret without decrypting the secret and wherein the encrypted shares cannot be combined to obtain the secret without decrypting the encrypted shares. This enhances the security of the system, because the second cryptographic unit is not able to decrypt the message without a user secret key.

The first cryptographic unit may comprise a secret encrypting unit for encrypting the secret by raising a predetermined number by a value representing the secret. This may provide a secure encryption method. Moreover, it may allow the second cryptographic unit to generate encrypted shares of the secret without needing to access the secret in the clear.

The systems set forth may be included in a communication system. For example, a communication system may comprise the first cryptographic unit and the second cryptographic unit for encryption, and provide at least an additional cryptographic unit to perform a corresponding decryption task.

The communication system may be used to communicate a message comprising medical information generated by a patient data entry application running on a mobile terminal. The hand-held device could comprise the first cryptographic unit and a transmission unit to transmit the generated encrypted information to the second cryptographic unit.

In another aspect, the invention provides a key generator for use in a system set forth hereinabove. The key generator may be arranged for generating a key for the second encrypter, wherein the key allows the second cryptographic unit to generate encrypted shares of the secret, but wherein the key does not allow the second cryptographic unit to decrypt the secret. This kind of key allows the second cryptographic unit to perform its task as a semi-trusted entity.

In another aspect, the invention provides a method of attribute-based encryption, comprising in a first device:

determining a message and a policy over a set of attributes, wherein the policy comprises a plurality of components;

generating an encrypted representation of the message and an encrypted representation of the plurality of components; and in a second device:

receiving the encrypted representation of the message and the encrypted representation of the plurality of components;

transforming the encrypted representation of the message and the encrypted representation of the plurality of components into an attribute-based encrypted message associated with the policy.

In another aspect, the invention provides a method of attribute-based encryption, comprising in a first device:

determining a message and a policy over a set of attributes, wherein the policy comprises a plurality of components;

generating a secret;

encrypting the message in dependence on the secret to obtain the encrypted representation of the message;

transforming respective ones of the components of the policy in dependence on the secret to obtain respective policy ciphertext components;

encrypting the secret to obtain an encrypted secret; and in a second device:

receiving the encrypted representation of the message and the encrypted representation of the plurality of components;

generating a plurality of encrypted shares of the encrypted secret, in dependence on a second encrypter secret key;

combining respective ones of the policy ciphertext components with respective ones of the encrypted shares of the encrypted secret, to obtain a cryptographic representation of the policy.

It will be appreciated by those skilled in the art that two or more of the above-mentioned embodiments, implementations, and/or aspects of the invention may be combined in any way deemed useful.

Modifications and variations of the communication system, the system, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from this description and will be elucidated hereinafter with reference to the drawings. Throughout the drawings, similar items are denoted by the same reference numerals.

DETAILED DESCRIPTION OF EMBODIMENTS

In the schemes disclosed herein, a host, also referred to as a data owner, is enabled to outsource policy creation to a semi-trusted entity, called proxy, and to encrypt messages for the users according to the given policy in such a way that the proxy (a) cannot access the cyphertext and (b) is enforced to encrypt the messages based on the attributes specified by the policy. By such outsourcing it is possible to reduce computational load on the host, which could be a mobile device with reduced processing power. Such reduction of computational load may be useful for wider adoption of the ABE encryption schemes.

Hereinafter, a number of schemes is disclosed in more detail. However, it will be understood that the details of the schemes disclosed herein should be regarded as examples only. Modifications and additions are within reach of the person skilled in the art on the basis of this description.

In a scheme for ABE disclosed herein, a central key authority is arranged for issuing secret keys to its users (who may be, for example, medical staff of a hospital). The key of a user is related to the attributes possessed by that user. The central authority may also issue a secret key for a semi-trusted entity, which may act as a proxy, for example, in the 'cloud'.

The term ABE ciphertext may generally relate to a message encrypted according to an access policy. According to the techniques disclosed herein, an ABE ciphertext may be created in two steps, one step performed by the host (data owner or encrypter, e.g. patient) of the message and one step performed by the semi-trusted proxy.

The host (data owner or encrypter) may create an intermediate ciphertext wherein a plurality of attributes are bound to a secret key that is to be shared among the attributes specified by the access policy. The intermediate ciphertext together with a description of the access policy is transmitted to a computationally powerful semi-trusted proxy. The proxy may decrypt a part of this intermediate ciphertext to obtain an encrypted secret key. This encrypted secret key is used by the proxy to create a ciphertext according to the access policy, by distributing shares of this secret key among the attributes appearing in the policy. This may be done using a secret sharing scheme, known in the art per se.

Figure 2:
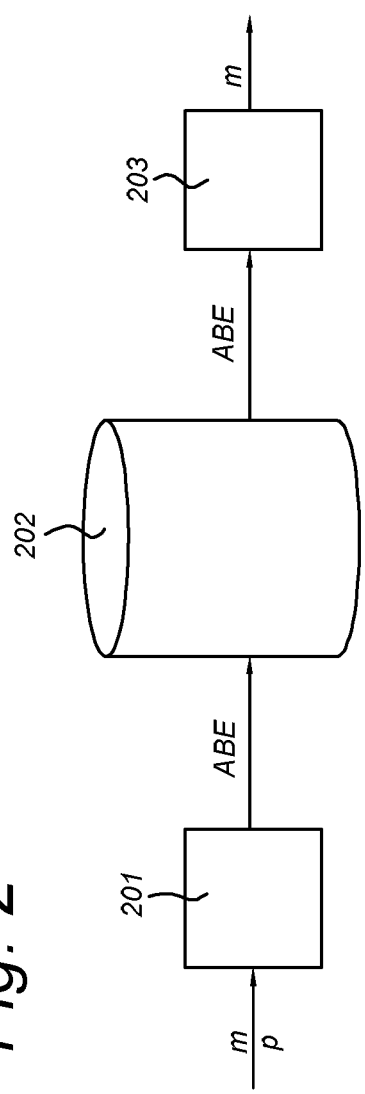
FIG. 2 is a block diagram of an attribute-based cryptographic system.

FIG. 2 illustrates an attribute-based encryption system. The encrypter 201 receives a message M and an access policy P, for example via user input (not shown) or from a database (not shown). After generating ciphertext (ABE) associated with the access policy, the ciphertext (ABE) is transmitted, in this case to a storage server 202. A decrypter 203 may retrieve the ciphertext (ABE) from the server 202 (or, alternatively, directly from the encrypter 201), and, based on a secret key associated with a set of attributes satisfying the policy P, decrypts the ciphertext ABE to retrieve a copy of the original message M.

Figure 3:
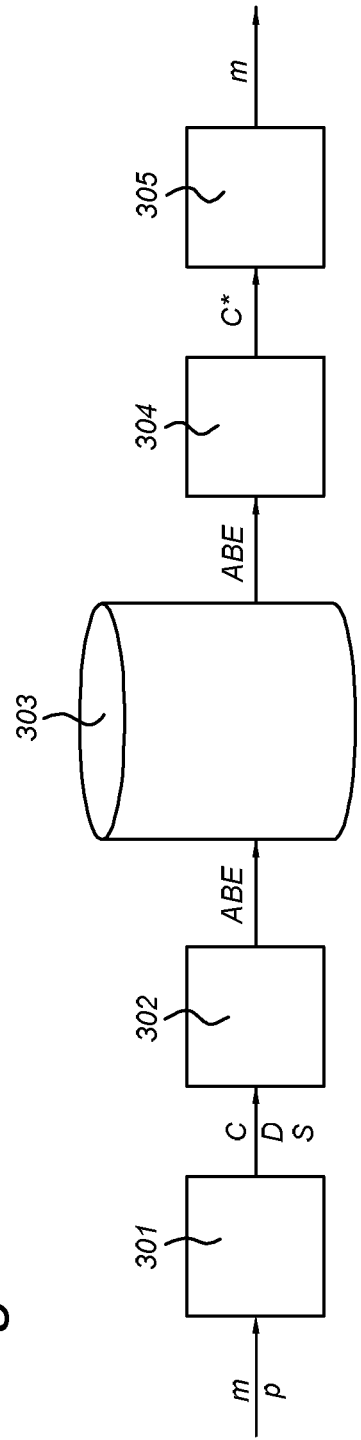
FIG. 3 is a block diagram of an attribute-based cryptographic system wherein cryptographic processing steps are outsourced to a proxy.
Figure 4:
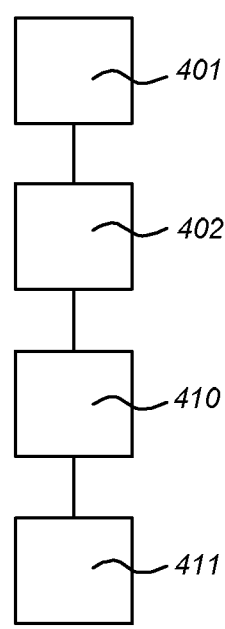
FIG. 4 is a flowchart of an attribute-based encryption process wherein part of an encryption step is outsourced to a proxy.

FIG. 3 illustrates an attribute-based encryption system in which the encryption and decryption are performed by a semi-trusted proxy system. FIG. 4 illustrates a method of operating the attribute-based encryption system shown in FIG. 3. A first encrypter 301 may determine in step 401 a message M and a policy P over a set of attributes, wherein the policy comprises a plurality of components. The components together form the policy. The message M and policy P may be determined, for example, by means of user input, by receiving them from an external source, or by generating them automatically.

The first encrypter 301 may generate in step 402 an encrypted representation C of the message and an encrypted representation D of the plurality of components. This may be done using a cryptographic technique known in the art per se.

The ciphertext C with the encrypted representation D of the plurality of components of the access policy may be transmitted to a second encrypter 302. This second encrypter 302 may also be referred to as a semi-trusted proxy. This transmission can take place in any way, by wireless or wired communication technology, or by means of a removable storage medium, for example.

The second encrypter receives in step 410 the encrypted representation of the message C and the encrypted representation of the plurality of components D. The second encrypter transforms in step 411 the encrypted representation of the message C and the encrypted representation of the plurality of components D into an attribute-based encrypted message ABE associated with the policy. This attribute-based encrypted message ABE may be treated further in the same way as in FIG. 2: it may be stored in a server 202 and/or transmitted to a decrypter 203 that has a secret key associated with a set of attributes that satisfies the policy P. The decrypter 203 may decrypt the attribute-based encrypted ciphertext ABE to obtain a copy of the message M.

Alternatively, as shown in FIG. 3, the attribute-based ciphertext ABE as generated by the second encrypter 302 may be stored in a server 303 and/or communicated to a proxy decrypter 304 which is provided with a key that is associated with a set of attributes that satisfies the policy P and that allows the proxy decrypter 304 to convert the attribute-based ciphertext ABE into a regular ciphertext C* that is not attribute-based. For example, the proxy decrypter generates El Gamal ciphertext. This ciphertext C* generated by the proxy decrypter is forwarded to the final decrypter 305, which may be implemented on a low-cost device, and performs the computationally cheap regular decryption, such as El Gamal decryption, to convert the regular ciphertext C* into a copy of the message M.

Figure 5:
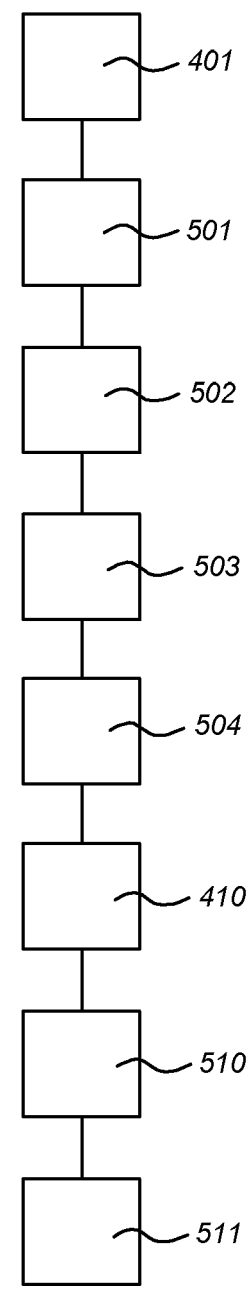
FIG. 5 is a flowchart of another embodiment of an attribute-based encryption process wherein part of an encryption step is outsourced to a proxy.

FIG. 5 shows another embodiment of the encryption method by means of a proxy encrypter. In step 401, the message and the policy are determined as in the embodiment of FIG. 4. The first encrypter 301 generates a secret in step 501. Such a secret may be a random number in a predetermined range, for example. For example, a secret is generated that can be easily used in a secret sharing scheme. In step 502 the first encrypter 301 may encrypt the message M in dependence on the secret to obtain the encrypted representation of the message (C). Moreover, the first encrypter may transform in step 503 respective ones of the components of the policy P in dependence on the secret to obtain respective policy ciphertext components D. For example, the first encrypter may raise a number that depends on an attribute of the policy to a power that depends on the secret. Moreover, the first encrypter may encrypt in step 504 the secret to obtain an encrypted secret S. For example, the first encrypter may raise a predetermined number to the power s. The result may be raised to the power d, wherein $\gamma/d$ is given to the second encrypter 302 as a secret key. Herein, $\gamma$ may be a randomly selected, secret number.

After the information has been transmitted to the second encrypter and received in step 410 by the second encrypter, the second encrypter may generate in step 510 a plurality of encrypted shares of the encrypted secret S, in dependence on a second encrypter secret key. For example, this may be done by a secret sharing scheme known in the art per se. For example, a threshold secret sharing scheme or an additive secret sharing scheme may be employed.

The second encrypter may combine in step 511 respective ones of the policy ciphertext components D with respective ones of the encrypted shares of the encrypted secret S, to obtain a cryptographic representation of the policy. Such combining operation of a policy ciphertext component with an encrypted share may comprise, for example, multiplication of the encrypted share with the policy ciphertext component. Other combining operations are also possible; for example, intermediate numbers may be derived from the policy ciphertext component and/or the encrypted share before the multiplication.

Figure 1:
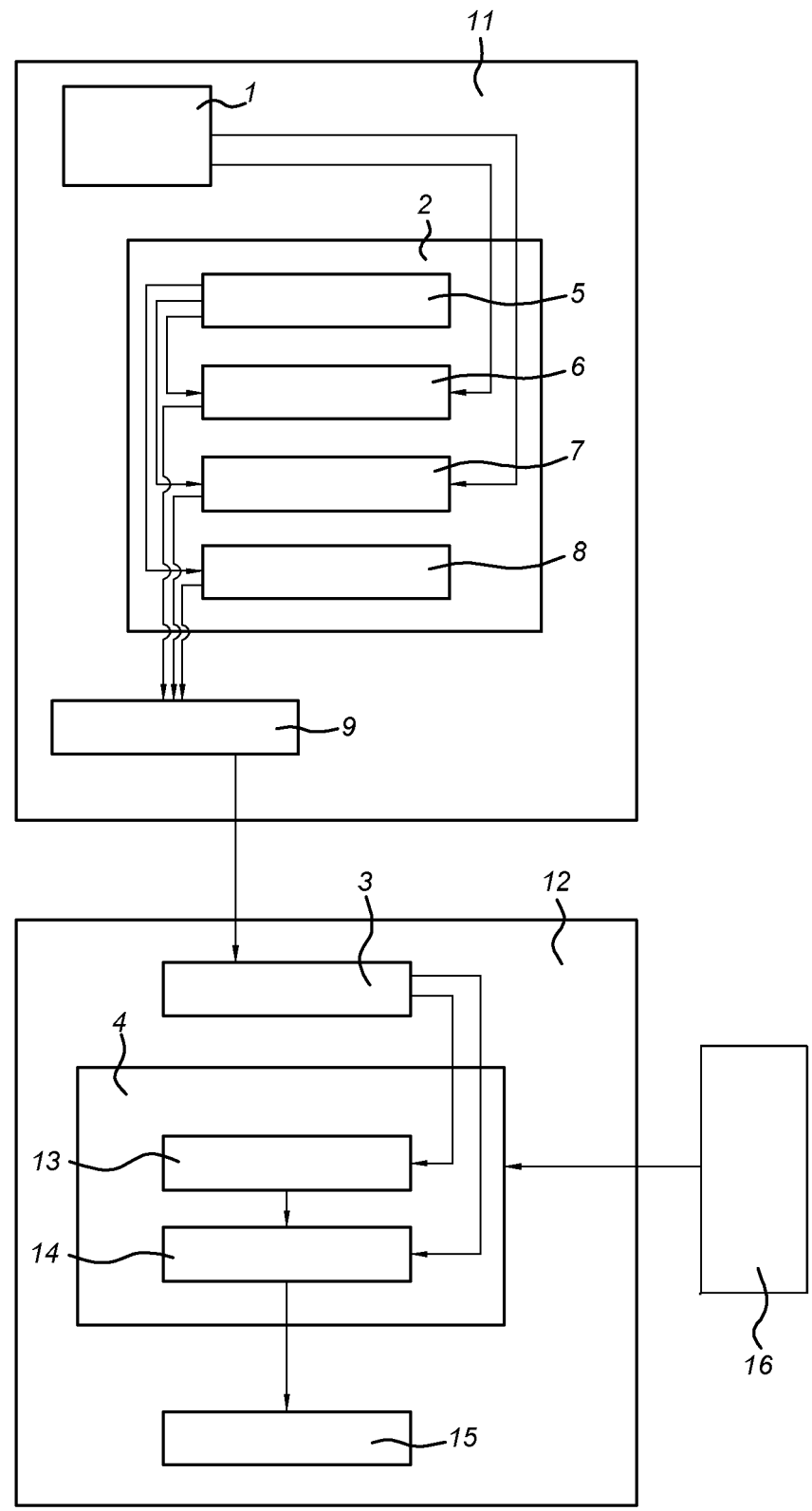
FIG. 1 is a block diagram of a system for attribute-based encryption wherein part of an encryption step is outsourced to a proxy.

FIG. 1 illustrates a system for attribute-based encryption. The system may comprise a first encrypter 11 and a second encrypter 12. The second encrypter 12 may also be referred to as a semi-trusted proxy. The first encrypter may comprise an input unit 1 for determining a message and a policy over a set of attributes, wherein the policy comprises a plurality of components. For example, the input unit 1 may be operatively coupled to a user interface for enabling a user to input data into a device. Such user interface may also be arranged for enabling the user to set the access policy of that data. Alternatively, the access policy may be determined automatically, for example based on the kind of data that is input. Alternatively, the input unit 1 may be arranged for receiving the message and the policy from another device or from another unit of the same device. The message and/or the access policy may also be determined automatically.

The first encrypter 11 may comprise a first cryptographic unit 2 operatively coupled to the input unit 1. The first cryptographic unit 2 may be arranged for generating an encrypted representation of the message and an encrypted representation of the plurality of components.

The second encrypter 12 may be implemented on a different device than the first encrypter 11, although this is not a limitation. The second encrypter 12 may have more processing power available than the first encrypter 11, so that the second encrypter 12 can perform the computational tasks associated with encrypting data using attribute-based encryption with more ease than the first encrypter 11. Moreover, the first encrypter 11 and the second encrypter 12 may be arranged for communicating with one another by means of any kind of data communication technology, including network communication and/or removable media exchange. For example, a secure data connection between the first encrypter 11 and the second encrypter 12 may be set up. For example, the first encrypter comprises a first transmit unit 9 for transmitting the encrypted message and the encrypted representation of the plurality of components to the second encrypter 12.

The second encrypter 12 may comprise a receiving unit 3 for receiving the encrypted representation of the message and the encrypted representation of the plurality of components. These items were generated by the first encrypter.

The second encrypter may further comprise a second cryptographic unit 4 for transforming the encrypted representation of the message and the encrypted representation of the plurality of components into an attribute-based encrypted message (ABE-ciphertext) associated with the policy.

The first encrypter 11 may be implemented as part of a mobile terminal and the second encrypter 12 may be implemented as part of a different device than the mobile terminal, such as a desktop computer or a server system.

The first cryptographic unit 2 may comprise a secret generator 5 arranged for generating a secret, such as a (pseudo-)randomly generated number. The first cryptographic unit 2 may further comprise a message encrypting unit 6 arranged for encrypting the message in dependence on the secret to obtain the encrypted representation of the message. The first cryptographic unit 2 may further comprise a policy transforming unit 7 arranged for transforming respective ones of the components of the policy in dependence on the secret to obtain respective policy ciphertext components. The first cryptographic unit may further comprise a secret encrypting unit 8 arranged for encrypting the secret to obtain an encrypted secret.

The second cryptographic unit 4 may comprise a share generating unit 13 arranged for generating a plurality of encrypted shares of the encrypted secret based on a key that does not allow decryption of the encrypted secret. The second cryptographic unit may further comprise a combining unit 14 arranged for combining respective ones of the policy ciphertext components with respective ones of the encrypted shares of the encrypted secret, to obtain a cryptographic representation of the policy. The ABE-ciphertext may comprise the cryptographic representation of the policy as well as the encrypted representation of the message.

The system may be configured in such a way that the components correspond to attributes. For example, each component may correspond to a different attribute that is relevant for the access policy. Information relating to the relationship between the attributes in the policy may also be conveyed from the first cryptographic unit to the second cryptographic unit. The second cryptographic unit consolidates these relationships in the ABE ciphertext by means of the secret sharing scheme.

The combining unit 14 may be arranged for enforcing a relationship between attributes in the policy by means of the encrypted shares of the encrypted secret. For example, the encrypted shares may be used to combine attributes in such a way that a key associated with at least a particular combination of the attributes is needed in order to decrypt the message.

The second cryptographic unit 4 may be arranged for generating the encrypted shares directly from the encrypted secret without decrypting the secret and wherein the encrypted shares cannot be combined to obtain the secret without decrypting the encrypted shares. For example, this may be realized by having the secret and its shares represented as a predetermined number raised to the power of the secret or as a power of the share of the secret, respectively. For example, the first cryptographic unit 2 may comprise a secret encrypting unit 8 for encrypting the secret by raising a predetermined number by a value representing the secret.

For example, the first and second encrypters may be part of a communication system for exchanging messages that comprise medical information generated by a data entry application running on a mobile terminal.

The second encrypter 12 may comprise a second transmit unit 15 for transmitting the ABE-ciphertext to another entity, such as a storage server for storing the ABE-ciphertext, or directly to another user device for decrypting the ABE-ciphertext.

The system may further comprise a key generator 16 arranged for generating a key for the second encrypter 12, wherein the key allows the second cryptographic unit 4 to generate encrypted shares of the secret, but wherein the key does not allow the second cryptographic unit 4 to decrypt the secret. Such a key generator 16 may be part of a central key authority that is capable of issuing user secret keys and/or public keys, including the secret keys associated with the attributes of individual users. However, the latter keys may also be generated by a separate key authority.

The proxy may not be able to use different attributes than the attributes specified by the access control policy that was specified by the host. Consequently, the proxy may not able to create a ciphertext that can be decrypted by users that do not possess the relevant attributes. Moreover, by using the proxy, the computational workload on the host (which may be mobile device with limited computational power) may be reduced. It is possible to implement the scheme in such a way that it does not cover enforcement of the relation between the attributes in the policy.

In the following description, an embodiment of the scheme is worked out in more detail. This embodiment represents only an example of the scheme. Modifications or alternative embodiments are within reach of the person skilled in the art on the basis of the present disclosure. Table 1 summarizes some of the symbols that are used in the remainder of this description.

TABLE 1

Notations

| | |
|---|---|
| $\lambda$ | a security parameter |
| $G_1$ | cyclic group $G_1$ |
| $G_T$ | target group $G_T$ |
| e(',') | an admissible bilinear map e: $G_1 \times G_1 \rightarrow G_T$ |
| g | generator for the cyclic group $G_1$ |
| $a_j$ | an attribute possessed by a user |
| $\omega$ | a set of attributes possessed by a user |
| $\tau$ | an access structure |
| $r_u$ | a probabilistically unique random value for each user, $r_u \in Z_p$ |
| s | a random secret key associated with a ciphertext, $s \in Z_p$ |
| M | a message to be encrypted |
| $SK_\omega$ | the secret key associated with an attribute set $\omega$ |
| $SK_{proxy}$ | the secret key for a proxy (cloud provider) |

The embodiment includes a number of algorithms that may be executed under control of the parties involved. There may be one or more authorities that control the distribution of keys and allocation of user rights. This includes allocating attributes to different users and generating and distributing user keys that are associated with the proper attributes of a user. The setup algorithm, the key generation for data originator algorithm, and the key generation for proxy algorithm may be carried out by one or more of such authorities. The data originator (or data owner), in this description, is the party who wishes to have a message encrypted using attribute-based encryption. The data originator may receive the data originator secret key $SK_\omega$ from the appropriate authority, choose or define a policy over the universe of available attributes, and provide the data to be encrypted. Such data is referred to herein as the message. The message may contain, for example, database entries for a patient database or a memo to be delivered to one or more persons having a set of credentials as prescribed in the policy. The message may be sent to the proxy. The proxy may convert the information received from the data originator into a ciphertext that is associated with the policy in a way known from the attribute-based encryption scheme. The data consumer is the party who receives and decrypts the ciphertext, based on a key associated with an appropriate set of attributes.

The embodiment may include implementations of the following algorithms.

1. Setup

Input: $\lambda$.

(a) select a random generator $g \in G_1$, select $\alpha, \beta, \gamma, d \in Z_p$ at random and keep them secret;

(b) select cryptographic hash functions $H_1: \{0,1\}^* \rightarrow G_1$ and $H_2: G_T \rightarrow \{0,1\}^n$;

(c) set $A = e(g,g)^\alpha$;

(d) set $\hat{A} = e(g,g)^{(\alpha+\gamma)\beta\gamma}$.

The public parameters may consist of $PK = (G_1, G_T, e, H_1, H_2, g^{\beta d})$.

The master secret key may consist of $MK = (g^\alpha, g^{\gamma, d})$.

As will be clear from the following, $\hat{A}$ is used when the encrypter needs a proxy (e.g. a cloud provider) to create the ABE ciphertext for him/her.

2. Key Generation for the First Encrypter or Data Originator

Inputs: PK, MK, $\omega$.

Select $r_u \in Z_p$ at random and set the secret key $SK_\omega$ to be:

$$SK_\omega = (D^{(1)} = g^\alpha g^\gamma g^{\beta\gamma_u},$$

$$D^{(2)} = g^{\beta r_u},$$

$$\forall a_j \in \omega : D_j^{(3)} = H_1(a_j)^{r_u}).$$

3. Key Generation for the Second Encrypter or Proxy

Inputs: PK, MK.

The key for the proxy $SK_{proxy}$ is generated in the following manner:

$$SK_{proxy} = \gamma/d.$$

It is noted that $g^{\beta d}$ is used as the public key of the proxy.

4. Encryption (to be Performed by First Encrypter or Data Originator):

Inputs: PK, M, $\tau$.

(a) Select a 'secret' $s \in Z_p$ at random;

(b) set the intermediate ciphertext for a message M to be $$CT_{intermediate} = (\tilde{C} = g^{\beta ds}, C = M \oplus H_2(\hat{A}^s), \forall a_j \in \tau : C_j' = H_1(a_j)^{-s}).$$

(c) Policy Enforcement (to be Performed by Second Encrypter or Proxy)
Inputs: $CT_{intermediate}, \tau, SK_{proxy}$.
i. decrypt $\hat{C}$ as $$\hat{C} = \tilde{C}^{SK_{proxy}} = g^{s\gamma\beta} = g^{\hat{s}}, \text{ for } \hat{s} = s\gamma\beta;$$

ii. create the policy $$\forall \alpha_j \in \tau: C_j = g^{\hat{s}_j} H_1(\alpha_j)^{-s},$$

wherein $\hat{s}_j$ is a share of $\hat{s}$ computed using for example additive secret sharing or threshold secret sharing method. Note that in order to share $\hat{s}$ the proxy only need access to $\hat{C}$ and need not use $\hat{s}$ directly. The skilled person is aware of the additive secret sharing and threshold secret sharing methods. A threshold secret sharing scheme is disclosed in Shamir, Adi (1979), "How to share a secret", *Communications of the ACM* 22 (11): 612-613.

iii. create the final ciphertext as $$CT = (C, \tilde{C}, \forall \alpha_j \in \tau: C_j = g^{\hat{s}_j} H_1(\alpha_j)^{-s}).$$

5 Decryption
Inputs: $SK_\omega$, CT.
Assumption: Let $\omega$ satisfy the access structure $\tau$. Otherwise, the decryption fails.
(a) compute $Z^{(1)} = \pi_{\alpha_j \in \omega} e(C_j, D^{(2)}) \cdot e(\hat{C}, D_j^{(s)}) = e(g,g)^{\hat{s}\beta r_u}$
(b) compute $Z^{(2)} = e(\hat{C}, D^{(1)}) = e(g^{\hat{s}}, g^\alpha g^\gamma g^{\beta r_u}) = e(g,g)^{(\alpha+\gamma)\hat{s}} e(g,g)^{\hat{s}\beta r_u}$;

(c) compute $Z^{(3)} = \dfrac{Z^{(2)}}{Z^{(1)}} = e(g,g)^{(\alpha+\gamma)\hat{s}}$;

(d) decrypt $M = C \oplus H_2(Z^{(3)})$.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A system for attribute-based encryption, comprising:
a first encryption system, comprising:
at least one first processor programmed to:
receive data to select a message and a policy based on a set of attributes of the policy, wherein the policy comprises a plurality of components; and
generate an encrypted representation of the message and an encrypted representation of at least one of the plurality of components, wherein the generating includes:
generating a secret;
encrypting the message in dependence on the secret to obtain the encrypted representation of the message;
transforming respective ones of the components of the policy in dependence on the secret to obtain respective policy ciphertext components; and
encrypting the secret to obtain an encrypted secret; and
a second encryption system comprising:
a receiver configured to receive the encrypted representation of the message and the encrypted representation of the plurality of components; and
at least one second processor programmed to transform the encrypted representation of the message and the encrypted representation of the plurality of components into an encrypted message associated with the policy, the encrypted message being based on the attributes of the policy, wherein the transforming includes:
generating a plurality of encrypted shares of the encrypted secret based on a key that does not allow decryption of the encrypted secret;

combining respective ones of the policy ciphertext components with respective ones of the encrypted shares of the encrypted secret, to obtain a cryptographic representation of the policy.

2. The system according to claim 1, wherein the first encryption system is implemented as part of a mobile terminal and the second encryption system is implemented as part of a different device than the mobile terminal.

3. The system according to claim 1, wherein respective ones of the components correspond to respective attributes.

4. The system according to claim 3, wherein the at least one second processor is programmed to enforce a relationship between attributes in the policy with the encrypted shares of the encrypted secret.

5. The system according to claim 1, wherein the at least one second processor is programmed to generate the encrypted shares directly from the encrypted secret without decrypting the secret and wherein the encrypted shares cannot be combined to obtain the secret without decrypting the encrypted shares.

6. The system according to claim 5, wherein the at least one first processor is programmed to encrypt the secret by raising a predetermined number by a value representing the secret.

7. A communication system comprising the system according to claim 1.

8. The communication system according to claim 7, wherein the message comprises medical information generated by a data entry application running on a mobile terminal.

9. The system according to claim 1, wherein the key allows the at least one second processor to generate encrypted shares of the secret, wherein the key does not allow the at least one second processor to decrypt the secret.

10. A method of attribute-based encryption, comprising
in a first device, using a first processor to perform the following steps:
selecting a message and a policy based on a set of attributes of the policy, wherein the policy comprises a plurality of components;
generating an encrypted representation of the message and an encrypted representation of the plurality of components, the generating including:
generating a secret;
encrypting the message in dependence on the secret to obtain the encrypted representation of the message;
transforming respective ones of the components of the policy in dependence on the secret to obtain respective policy ciphertext components; and
encrypting the secret to obtain an encrypted secret; and
in a second device, using a second processor to perform the following steps:
receiving the encrypted representation of the message and the encrypted representation of the plurality of components;
transforming the encrypted representation of the message and the encrypted representation of the plurality of components into an encrypted message associated with the policy, the encrypted message being based on the attributes of the policy, the transforming including:
generating a plurality of encrypted shares of the encrypted secret, in dependence on an encrypter secret key; and
combining respective ones of the policy ciphertext components with respective ones of the encrypted shares of the encrypted secret, to obtain a cryptographic representation of the policy.

11. The method according to claim 10, wherein:
the first device is part of a mobile terminal; and
the second device is different from the mobile terminal.

12. The method according to claim 10, further including:
generating the encrypted shares directly from the encrypted secret without decrypting the secret;
wherein the encrypted shares cannot be combined to obtain, the secret without decrypting the encrypted shares.

13. The method according to claim 10, further including:
encrypting the secret by raising a predetermined number by a value representing the secret.

14. The method according to claim 10, further including:
generating the key to allow for the generation encrypted shares of the secret,
wherein the key does not allow the second cryptographic unit to decrypt the secret.

15. A system for attribute-based encryption, comprising:
a mobile terminal comprising a first computer processor programmed to:
receive user inputs to select a message and a policy based on a set of attributes of the policy;
generate a secret;
encrypt the message in dependence on the secret to obtain the encrypted representation of the message;
transform at least one of the attributes of the policy based on the secret to obtain respective policy ciphertext attributes;
encrypt the secret to obtain an encrypted secret;
a second computer processor operatively connected with the mobile terminal via a communication system to receive the encrypted representation of the message and the encrypted representation of the plurality of attributes from the first computer processor, the second computer processor programmed to:
generate a plurality of encrypted shares of the encrypted secret based on a key that does not allow decryption of the encrypted secret; and
combine at least one of the policy ciphertext attributes with corresponding ones of the encrypted shares of the encrypted secret to obtain a cryptographic representation of the policy.

16. The system according to claim 15, wherein the second computer processor is programmed to generate the encrypted shares directly from the encrypted secret without decrypting the secret,
wherein the encrypted shares cannot be combined to obtain the secret without decrypting the encrypted shares.

17. The system according to claim 16, wherein the first computer processor is programmed to encrypt the secret by raising a predetermined number by a value representing the secret.

18. The system according to claim 15, wherein the key does not allow the at least one computer processor to decrypt the secret.

19. The system according to claim 15, wherein the mobile terminal is programmed to receive the user inputs to select the message comprising medical information by the running a patient data entry application.

20. The system according to claim 19, wherein the second computer processor is cloud-based and is operatively connected with the mobile terminal via the communication system comprising the Internet to receive the encrypted representation of the message comprising medical information and the encrypted representation of the plurality of attributes from the mobile terminal comprising the first computer processor.

\* \* \* \* \*